United States Patent Office 2,917,514
Patented Dec. 15, 1959

2,917,514

PROCESS FOR THE PREPARATION OF 4-ETHYLCYCLOHEXENE

Gordon D. Brindell, Ponca City, Okla., assignor, by mesne assignments, to Petroleum Chemicals, Inc., New Orleans, La., a corporation of Delaware No Drawing. Application December 11, 1957
Serial No. 701,983

11 Claims. (Cl. 260—666)

This invention relates to a process for the preparation of 4-ethylcyclohexene by the preferential reduction of 4-vinylcyclohexene. More particularly it relates to a process whereby the reduction is specific for the reduction of the vinyl group to the total exclusion of the reduction of the cyclohexene portion of the 4-vinylcyclohexene molecule.

Heretofore the reduction of 4-vinylcyclohexene has been accomplished by the reduction of that compound using hydrogen in the presence of a hydrogenation catalyst. Proposed catalysts include Raney nickel, palladium, platinum, cobalt, etc. Regardless of the particular catalyst used, the result is the reduction of the 4-vinylcyclohexene by two competitive reduction reactions. These two competitive reactions are the reduction of the vinyl group and the reduction of the cyclohexene portion of the molecule. Although the hydrogenation processes, as taught in the prior art, result in the reduction of the vinyl group at a much greater rate than that of the cyclohexyl group, the reduction rate of the latter is not zero and, as a consequence, the 4-ethylcyclohexene so produced is contaminated with ethylcyclohexane. It therefore becomes necessary to purify the final production and since 4-ethylcyclohexene and ethylcyclohexane have boiling points which differ by only 1.2° C., separation by fractional distillation is almost impossible.

It is therefore a principal object of the present invention to provide a process whereby the disadvantages of the prior art processes are obviated. It is another object of my invention to provide a process whereby the vinyl group of 4-vinylcyclohexene can be reduced to the total exclusion of the reduction of the cyclohexene portion of the molecule. These and other objects and advantages of this invention will become apparent to those skilled in the art as the description proceeds.

Broadly stated, the present invention comprises a process for the preparation of 4-ethylcyclohexene from 4-vinylcyclohexene which comprises the following steps: dissolving the 4-vinylcyclohexene in liquid ammonia. To the solution of 4-vinylchlorohexene in ammonia is then added a metal which is soluble in liquid ammonia and will react with a hydrolytic agent at the temperature of liquid ammonia liberating hydrogen. The reaction is then allowed to proceed at about the boiling point of liquid ammonia to completion and upon completion of the reaction the ammonia is removed by distillation. After all the ammonia has been removed, water is added to the residue, the mixture agitated and then allowed to separate into two layers, an upper organic layer consisting predominately of 4-ethylcyclohexene and unreacted 4-vinylcyclohexene and a lower aqueous layer. The upper organic layer is then removed and recycled through the reduction step until substantially all of the 4-vinylcyclohexene is reduced to 4-ethylcyclohexene.

Before proceeding with a specific example illustrating my invention, it may be well to indicate in general the nature and the amounts of the different materials required in the process.

Suitable hydrolytic agents include any component that will react with the metal liberating hydrogen, such as a liquid alcohol. Preferred alcohols are those having from 1 to 5 carbon atoms. Of these alcohols, methyl alcohol and ethyl alcohol are generally preferred, because they are relatively cheap and are readily available. I wish to point out, however, that the process of my invention is not limited to alcohols but includes any substance that will react with the metal in liquid ammonia in the absence of a catalyst to liberate hydrogen but which does not react with ammonia to form ammonium salts. Examples of suitable compounds in addition to the alcohols mentioned above include acid amides, primary aryl amines, alkyl mercaptans, and aliphatic aldehydes. As to the amount of the alcohol or other hydrolytic agents used that may be varied from about 2 moles to 4 moles of the hydrolytic agent per mole of the 4-vinylcyclohexene. If desired, greater quantities of the hydrolytic agent may be used, but generally I do not prefer to use an excess greater than 4 moles of the hydrolytic agent per mole of the vinyl compound because the excess must be removed eventually from the system.

Although sodium is the preferred metal, both because of its availability and cost, other metals may be used. These other metals include calcium, lithium, magnesium, potassium, and rubidium. Specifically, I have found that any metal may be used provided it has a specific gravity within the range of 0.53 to 1.74. Theoretically, 2 moles of the monovalent metal or 1 mole of the divalent are required per mole of the 4-vinylcyclohexene. It is preferable, but not essential, to use an excess of the metal. Such excess generally need not be large, for example, an excess of around 5 to 20 percent is usually sufficient. I believe a slight excess is to be preferred because some of the metal will react with the liquid ammonia forming the metal amide.

The quantity of ammonia used as a solvent may be varied a great deal. The only requirement here is that a sufficient amount of ammonia be added to the reaction mass to dissolve all of the metal used. The minimum quantity necessary can be obtained from solubility tables wherein the solubility of the different metals in liquid ammonia are given. It should be remembered, however, that the reaction is conducted at a temperature equal to the boiling point of liquid ammonia or slightly below and at this temperature the rate of solution is slow. Generally, I prefer to use a rather large excess of liquid ammonia and this amount varies from about 5 to 10 times the minimum quantity as determined from solubility tables.

I have found further that best results are obtained if the reaction mass consisting of the 4-vinylcyclohexene, liquid ammonia and metal is slowly agitated for a period of ½ to 2 hours before the alcohol or other hydrolytic agent is added. After the alcohol or other hydrolytic agent has been added, the reaction is allowed to proceed for a period of time varying from 15 minutes to several hours. Although good results have been obtained wherein the reaction time is as short as 15 minutes, better results are obtained if the reaction is allowed to proceed for about 2 to 3 hours.

In order to disclose the nature of the present invention still more clearly, the following illustrative example will be given in which parts by weight bear the same relation to parts by volume as do grams to cubic centimeters.

*Example*

To 54 parts by weight of 4-vinylcyclohexene contained in a reaction vessel fitted with an agitator and Dry Ice reflux condenser was added liquid ammonia until the total volume was equal to 600 parts by volume. Twenty-three parts of metallic sodium was slowly added to the reaction mass over a period of 1¼ hours during which time the reaction mass was agitated by gentle stirring. To insure that all the sodium had been dissolved, the mixture was gently stirred for an additional period of 1 hour. At the end of that period 64 parts of methanol was slowly added over a period of 1¾ hours. After all the methanol had been added, the mixture was gently agitated for an additional period of 3 hours during which time the reaction mass was maintained at about the boiling point of liquid ammonia by means of the Dry Ice reflux condenser. At the end of the reaction period, the ammonia was allowed to evaporate, leaving a white residue in the reaction vessel. Water was then added to the white residue contained in the vessel, the contents gently agitated, and then the mixture was allowed to separate into two layers. The organic layer consisting predominately of 4-ethylcyclohexene and 4-vinylcyclohexene was removed and then recycled through the reduction procedure until all the 4-vinylcyclohexene had been converted to 4-ethylcyclohexene.

Similar results to that reported above were obtained when calcium, lithium, magnesium, potassium, and rubidium were substituted for sodium in the foregoing example. In other examples other hydrolytic agents were substituted for the methanol used in the above-mentioned example. The other hydrolytic agents used were ethyl alcohol, methyl alcohol, butyl alcohol, and ethylene glycol. As before, similar results were obtained.

While particular embodiments of the invention have been described, it will be understood, of course, that the invention is not limited thereto, since many modifications may be made as will be understood by those skilled in the art. As for example, the metal may be dissolved in the ammonia to which solution the 4-vinylcyclohexene is added rather than the alternate procedure as given in the example. As another method the three components, 4-vinylcyclohexene, ammonia, and alcohol, may be mixed in any order and then the metal added to the resulting solution. It is, therefore, contemplated to cover by the appended claims any such modifications as fall within the true spirit and scope of the invention.

The invention having thus been described, what is claimed and desired to be secured by Letters Patent is:

1. A process for the preparation of 4-ethylcyclohexene by the controlled reduction of 4-vinylcyclohexene which comprises dissolving said 4-vinylcyclohexene in liquid ammonia, adding thereto a light metal having a specific gravity within the range of 0.53 to 1.74, stirring said mixture until all of said metal has dissolved in said liquid ammonia, adding to the resulting solution a hydrolytic agent, allowing the reaction to proceed at about the boiling point of liquid ammonia for a period varying from ¼ to 3 hours, removing the ammonia from the reaction mass, adding water to the residue, allowing the mixture to separate into two layers, an upper organic layer consisting predominately of 4-ethylcyclohexene and unreacted 4-vinylcyclohexene and a lower aqueous layer, separating the layers and then recycling said upper layer until substantially all of the 4-vinylcyclohexene has been converted to 4-ethylcyclohexene.

2. The process of claim 1 wherein the hydrolytic agent is a liquid alcohol.

3. The process of claim 1 wherein the hydrolytic agent is an alcohol containing from 1 to 5 carbon atoms.

4. The process of claim 1 wherein the hydrolytic agent is methanol.

5. The process of claim 1 wherein the hydrolytic agent is ethanol.

6. The process of claim 1 wherein the light metal is sodium.

7. The process of claim 1 wherein the light metal is potassium.

8. The process of claim 1 wherein the light metal is lithium.

9. The process of claim 1 wherein the light metal is calcium.

10. The process of claim 1 wherein the light metal is magnesium.

11. The process of claim 1 wherein the light metal is rubidium.

References Cited in the file of this patent

UNITED STATES PATENTS

| | | |
|---|---|---|
| 2,182,242 | Wooster | Dec. 5, 1934 |
| 2,576,743 | Allenby | Nov. 27, 1951 |
| 2,644,848 | Craig | July 7, 1953 |